(12) United States Patent
Zhang et al.

(10) Patent No.: US 11,012,194 B2
(45) Date of Patent: May 18, 2021

(54) METHOD AND DEVICE FOR SIDELINK DATA DUPLICATION

(71) Applicant: Telefonaktiebolaget LM Ericsson (publ), Stockholm (SE)

(72) Inventors: Zhang Zhang, Beijing (CN); Shehzad Ali Ashraf, Aachen (DE); Liang Hu, Stockholm (SE); Marco Belleschi, Solna (SE); Ricardo Blasco Serrano, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 211 days.

(21) Appl. No.: 16/317,527

(22) PCT Filed: Jul. 26, 2018

(86) PCT No.: PCT/CN2018/097198
§ 371 (c)(1),
(2) Date: Jan. 11, 2019

(87) PCT Pub. No.: WO2019/029375
PCT Pub. Date: Feb. 14, 2019

(65) Prior Publication Data
US 2020/0403731 A1    Dec. 24, 2020

(30) Foreign Application Priority Data
Aug. 10, 2017    (WO) ................ PCT/CN2017/096765

(51) Int. Cl.
*H04B 7/00*    (2006.01)
*H04L 1/08*    (2006.01)
(Continued)

(52) U.S. Cl.
CPC .............. *H04L 1/08* (2013.01); *H04L 5/0044* (2013.01); *H04W 76/14* (2018.02); *H04W 92/18* (2013.01)

(58) Field of Classification Search
CPC ........ H04L 1/08; H04L 5/0044; H04W 76/14; H04W 92/18
(Continued)

(56) References Cited

U.S. PATENT DOCUMENTS

2011/0122761 A1    5/2011  Sriram
2015/0319595 A1   11/2015  Hakola et al.
(Continued)

FOREIGN PATENT DOCUMENTS

CN    106470384 A    3/2017
CN    110463126 A   11/2019
(Continued)

OTHER PUBLICATIONS

3GPP TS 23.185 V14.3.0 (Jun. 2017), "Architecture Enhancements for V2X Services," 3rd Generation Partnership Project; Technical Specification Group Services and System Aspects; (Release 14), Jun. 2017, 35 pages.
(Continued)

*Primary Examiner* — Chuong T Ho
(74) *Attorney, Agent, or Firm* — NDWE LLP

(57) ABSTRACT

A method and device for sidelink data duplication. The method includes: determining whether a sidelink data packet is to be duplicated based on a sidelink radio bearer on which the sidelink data packet is to be transmitted; performing sidelink data duplication of the sidelink data packet, when it is determined that the sidelink data packet is to be duplicated based on the sidelink radio bearer. Therefore, a solution provides for properly configuring data duplication for sidelink.

16 Claims, 8 Drawing Sheets

(51) Int. Cl.
*H04W 76/14* (2018.01)
*H04L 5/00* (2006.01)
*H04W 92/18* (2009.01)

(58) Field of Classification Search
USPC .......................................................... 370/310
See application file for complete search history.

(56) References Cited

U.S. PATENT DOCUMENTS

| | | | |
|---|---|---|---|
| 2017/0181206 A1* | 6/2017 | Lee ........................ | H04W 28/06 |
| 2018/0332501 A1* | 11/2018 | Tseng ...................... | H04L 1/189 |
| 2019/0289489 A1* | 9/2019 | Yi ............................ | H04L 1/189 |
| 2020/0008266 A1* | 1/2020 | Pan ......................... | H04W 80/08 |
| 2020/0099481 A1* | 3/2020 | Pan ......................... | H04W 76/30 |
| 2020/0128596 A1* | 4/2020 | Yi ........................... | H04W 28/0205 |

FOREIGN PATENT DOCUMENTS

| | | | |
|---|---|---|---|
| WO | 2015/126430 A1 | 8/2015 |
| WO | 2015/163624 A1 | 10/2015 |
| WO | 2015163639 A1 | 10/2015 |
| WO | 2017/007285 A1 | 1/2017 |
| WO | 2018/175842 A1 | 9/2018 |

OTHER PUBLICATIONS

3GPP TS 36.213 V14.2.0 (Mar. 2017), "Physical layer procedures," 3rd Generation Partnership Project; Technical Specification Group Radio Access Network; Evolved Universal Terrestrial Radio Access (E-UTRA); (Release 14), Mar. 2017, 454 pages.

3GPP TS 36.321 V14.2.1 (Mar. 2017), "Medium Access Control (MAC) protocol specification," 3GPP Technical Specification Group Radio Access Network; Evolved Universal Terrestrial Radio Access (E-UTRA); (Release 14), Mar. 2017, 106 pages.

3GPP TS 22.185 V14.2.1 (Nov. 2016), "Service requirements for V2X services," 3rd Generation Partnership Project; Technical Specification Group Services and System Aspects; (Release 14), Stage 1, Nov. 2016, 14 pages.

3GPP TS 36.331 V14.1.0 (Dec. 2016), "Radio Resource Control (RRC); Protocol specification," 3rd Generation Partnership Project; Technical Specification Group Radio Access Network; Evolved Universal Terrestrial Radio Access (E-UTRA); Release 14, Dec. 2016, 654 pages.

3GPP Ts 23.303 V15.0.0 (Jun. 2017), "Proximity-based services (ProSe); Stage 2," 3rd Generation Partnership Project; Technical Specification Group Services and System Aspects; Release 15, Jun. 2017, 130 pages.

Huawei et al., "New Wid on 3GPP V2X Phase 2," 3GPP TSG RAN Meeting #75, Mar. 6-9, 2017, RP-170798, 8 pages.

International Search Report and Written Opinion for Application No. PCT/CN2018/097198, dated Nov. 13, 2018, 10 pages.

International Preliminary Report on Patentability (Chapter I), PCT App. No. PCT/CN2018/097198, dated Feb. 20, 2020, 6 pages.

Supplementary European Search Report and Search Opinion, EP App. No. 18825558.2, dated Mar. 4, 2020, 6 pages.

Ericsson, "Dynamic Reconfiguration of Split Bearer or Duplication", 3GPP TSG-RAN WG2 #98, R2-1704374, May 15-19, 2017, pp. 1-3.

First Office Action, CN App. No. 201880002926.0, dated Sep. 30, 2020, 11 pages (2 pages of English Translation and 9 pages of Original Document).

Office Action, In App. No. 201817049697, dated Aug. 6, 2020, 6 pages.

OPPO, "The Impact of Duplication on MAC", 3GPP TSG RAN WG2#NR_AdHoc#2, R2-1706344, Jun. 27-29, 2017, pp. 1-3.

Second Office Action, CN App. No. 201880002926.0, dated Feb. 2, 2021, 4 pages (1 page of English Translation and 3 pages of Original Document).

ASUSTeK, "Activation and Deactivation of UL PDCP duplication", 3GPP TSG-RAN WG2 Meeting NR Ad hoc#2, R2-1706945, Jun. 27-29, 2017, 7 pages.

Huawei, HiSilicon, "Configuration and control of packet duplication", 3GPP TSG RAN WG2 NR Ad Hoc, R2-1706716, Jun. 27-29, 2017, 8 pages.

Intel Corporation, "CA packet duplication in Dual Connectivity", 3GPP TSG-RAN WG2 Meeting Ad hoc, R2-1707049, Jun. 27-29, 2017, 5 pages.

Intel Corporation, "On Carrier Aggregation for LTE V2V Sidelink Communication", 3GPP TSG RAN1 WG Meeting#88bis, R1-1705446, Apr. 3-7, 2017, 11 pages.

Notice of Reasons for Refusal, JP App. No. 2019-564059, dated Jan. 27, 2021, 6 pages (3 pages of English Translation and 3 pages of Original Document).

* cited by examiner

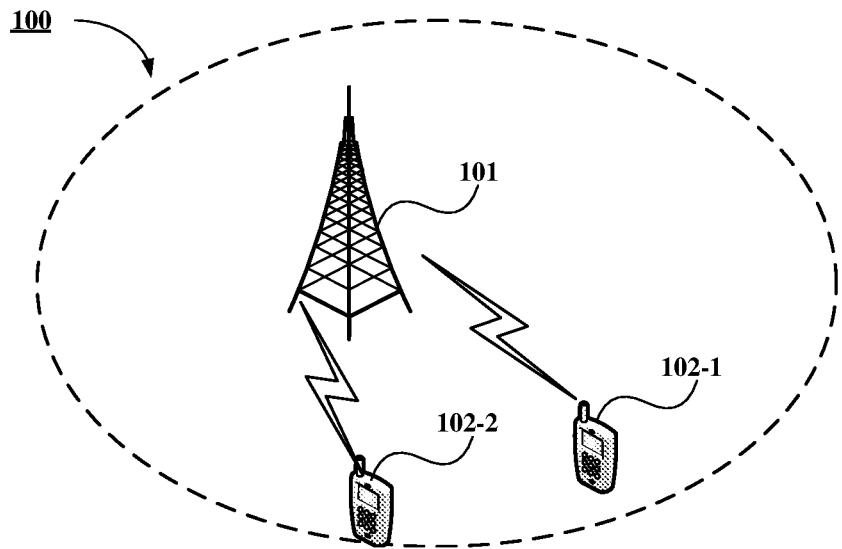

201
determining, by a terminal device, whether a sidelink data packet is to be duplicated based on a sidelink radio bearer on which the sidelink data packet is to be transmitted

202
performing, by the terminal device, sidelink data duplication of the sidelink data packet when it is determined that the sidelink data packet is to be duplicated based on the sidelink radio bearer

Fig. 2

200
METHOD AND DEVICE FOR SIDELINK DATA DUPLICATION

CROSS-REFERENCE TO RELATED APPLICATIONS

This application is a National stage of International Application No. PCT/CN2018/097198, filed Jul. 26, 2018, which claims priority to International Application No. PCT/CN2017/096765, filed Aug. 10, 2017, which are all hereby incorporated by reference.

TECHNICAL FIELD

Embodiments of the present disclosure generally relate to the field of communications, and more particularly, to a method and device for sidelink data duplication.

BACKGROUND

This section introduces aspects that may facilitate better understanding of the present disclosure. Accordingly, the statements of this section are to be read in this light and are not to be understood as admissions about what is in the prior art or what is not in the prior art.

In release 14 of long term evolution (LTE), a plurality of extensions for device to device (D2D), or maybe referred to as ProSe or sidelink, support V2X (Vehicle-to-Everything) communications. In particular, the sidelink may refer to a UE to UE interface for sidelink communication, V2X sidelink communication and sidelink discovery. The sidelink corresponds to the PC5 interface as defined in 3GPP TS 23.303.

V2X may include any combination of direct communication between vehicles, pedestrians and infrastructures. V2X may take advantage of a network (NW) infrastructure when it is available, but at least a basic V2X connectivity should be possible even in case of lack of coverage.

V2X may carry both non-safety and safety information, where each of applications and services (or referred to as traffics) may be associated with specific requirements, e.g., in terms of latency, reliability and capacity. There are several different use cases defined for V2X, such as V2V (vehicle-to-vehicle), V2P (vehicle-to-pedestrian), V2N (vehicle-to-network) and V2I (vehicle-to-infrastructure).

On the other hand, there are two different resource allocation (RA) procedures for V2X on sidelink, i.e. centralized RA (which may be called "mode 3") and distributed RA (which may be called "mode 4"). One or more transmission resources are selected from one or more resource pools which is/are predefined or configured by a network device.

With the centralized RA, one or more sidelink resources for transmission may be scheduled by a network device and signaled to a terminal device using downlink control information (DCI), such as in DCI format 5A. This is the case for both physical sidelink control channel (PSCCH) and physical sidelink shared channel (PSSCH).

With the distributed RA, each terminal device may independently decide one or more sidelink resources for each transmission, such as for both PSCCH and PSSCH. The sidelink resources are selected by the terminal device from one or more resource pools configured by the network device using a broadcast signaling, such as a system information block (SIB).

In addition, a logical channel prioritization procedure is applied when a new transmission is performed. Each sidelink logical channel may have an associated priority, which may be referred to as ProSe per packet priority (PPPP). Multiple sidelink logical channels may have the same associated priority.

An application layer of the terminal device may set the PPPP for each V2X message when the message is transmitted to a lower layer for transmission. A packet delay budget (PDB) of a protocol data unit (PDU) may be determined from the PPPP. A low PDB may be mapped to a high priority value of the PPPP. The terminal device may indicate a traffic priority (e.g., PPPP) for a sidelink communication to the network device.

SUMMARY

It has been found that data duplication may be more useful for a service requiring high reliability and/or low latency. Therefore, it should be possible to configure data duplication for a sidelink carrying the kind of service. However, currently quality of service (QoS) is not defined for sidelink. Therefore, a solution is needed to properly configure data duplication for sidelink.

In order to solve at least the above problem, some methods, apparatus, devices and computer programs are provided in the present disclosure. It may be appreciated that embodiments of the present disclosure are not limited to a wireless system operating in new radio (NR) network, but could be more widely applied to any application scenario where similar problems exist.

Various embodiments of the present disclosure mainly aim at providing methods, devices and computer programs for sidelink data transmission. Other features and advantages of embodiments of the present disclosure will also be understood from the following description of specific embodiments when reading in conjunction with the accompanying drawings, which illustrate, by way of example, the principles of embodiments of the present disclosure.

In general, embodiments of the present disclosure provide a solution for sidelink data duplication. In this disclosure, whether a sidelink data packet is to be duplicated is determined by a terminal device based on a sidelink radio bearer (SLRB) on which the sidelink data packet is to be transmitted.

In a first aspect, there is provided a method in a terminal device for sidelink data duplication, the method includes: determining whether a sidelink data packet is to be duplicated based on a sidelink radio bearer on which the sidelink data packet is to be transmitted; and performing sidelink data duplication of the sidelink data packet when it is determined that the sidelink data packet is to be duplicated based on the sidelink radio bearer.

In an embodiment, the sidelink radio bearer may be identified by one or more of the following information: a sidelink radio bearer identifier, information on packet priority, one or more logical channel identifiers, a logical channel group identifier and a traffic flow identifier.

In an embodiment, one or more sidelink radio bearers may be predefined or configured to allow for sidelink data duplication of sidelink data packets to be transmitted thereon.

In an embodiment, one or more conditions related to the one or more sidelink radio bearers may be further predefined or configured to allow for sidelink data duplication.

In an embodiment, the method may further include: obtaining one or more parameters for the sidelink data duplication. The parameters may include at least one of the following: a congestion busy ratio (CBR) of a sidelink, channel state information (CSI) of the sidelink, feedback information of the sidelink; a hybrid automatic repeat request (HARD) feedback, a radio link control (RLC) status report, transmission control protocol acknowledgement, application layer acknowledgement; speed information of the terminal device, position information of the terminal device, battery information of the terminal device and classification information of the terminal device.

In an embodiment, it is determined that the sidelink data packet is to be duplicated when it is predefined or configured that sidelink data packets associated to the sidelink radio bearer are allowed to be duplicated and the one or more parameters satisfy one or more predefined conditions.

In an embodiment, the sidelink data duplication of the sidelink data packet may be performed at a medium access control (MAC) layer of the terminal device. The MAC layer may be informed of a mapping of a logical channel and the sidelink radio bearer by a packet data convergence protocol (PDCP) layer and/or a radio link control (RLC) layer.

In an embodiment, the sidelink data duplication of the sidelink data packet may be performed at a PDCP layer of the terminal device.

In an embodiment, the sidelink data duplication of the sidelink data packet may be performed at an application layer of the terminal device.

In an embodiment, the one or more sidelink radio bearers may be determined by an application layer or by a duplication function of the terminal device with a mapping to the sidelink radio bearer that is allowed for the sidelink data duplication.

In an embodiment, the sidelink data packet is to be transmitted on a first sidelink radio bearer; and a duplicated sidelink data packet obtained from the sidelink data duplication is to be transmitted on a second sidelink radio bearer.

In an embodiment, the second sidelink radio bearer is mapped to a sidelink radio bearer with the lowest priority.

In an embodiment, the second sidelink radio bearer is mapped to a sidelink radio bearer having an identifier which is equal to the identifier of the first sidelink radio bearer adjusted by a predefined or configured value.

In an embodiment, the method may further include: receiving configuration information for the sidelink data duplication from a network device.

In an embodiment, the configuration information may be transmitted via a broadcast signaling and/or a dedicated signaling.

In an embodiment, the method may further include: transmitting assist information for the sidelink data duplication to the network device.

In an embodiment, the assist information may include at least one of the following: capability information of the terminal device, information on which layer the sidelink data duplication is performed, and information on the sidelink radio bearer for which sidelink data duplication is desired.

In an embodiment, the method may further include: determining a carrier used for the sidelink data duplication based on configuration information from a network device and/or one or more parameters obtained by the terminal device.

In a second aspect, there is provided a method in a network device for sidelink data duplication, the method includes: transmitting configuration information for the sidelink data duplication to a terminal device. The configuration information is used by the terminal device to determine whether a sidelink data packet is to be duplicated based on a sidelink radio bearer on which the sidelink data packet to be transmitted.

In one embodiment, the configuration information may be transmitted via a broadcast signaling and/or a dedicated signaling.

In one embodiment, the method may further include: receiving assist information for the sidelink data duplication from the terminal device; and determining the configuration information from the assist information.

In one embodiment, the assist information may include at least one of the following: capability information of the terminal device, information on which layer the sidelink data duplication is performed, and information on the sidelink radio bearer for which sidelink data duplication is desired.

In a third aspect, there is provided a terminal device, including a processor and a memory. The memory contains instructions executable by the processor whereby the terminal device is operative to perform a method according to the first aspect.

In a fourth aspect, there is provided a network device, including a processor and a memory. The memory contains instructions executable by the processor whereby the network device is operative to perform a method according to the second aspect.

According to various embodiments of the present disclosure, whether a sidelink data packet is to be duplicated is determined by a terminal device based on a sidelink radio bearer on which the sidelink data packet is to be transmitted. Therefore, a solution is proposed to properly configure data duplication for sidelink.

Furthermore, sidelink packet duplication for a specific kind of traffic may be enabled based on an existing framework. Therefore, performance of the sidelink could be improved and impact on the existing framework could be small.

In addition, with the sidelink packet duplication, a framework with differentiated QoS could be provided for a sidelink traffic that requires high reliability. Furthermore, dynamic configuration may be possible based on changing behavior and radio condition of the terminal device.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 1 is a schematic diagram which shows a wireless communication network;

FIG. 2 is a flowchart which shows a method for sidelink data duplication in accordance with an embodiment of the present disclosure;

DETAILED DESCRIPTION

Figure 3:
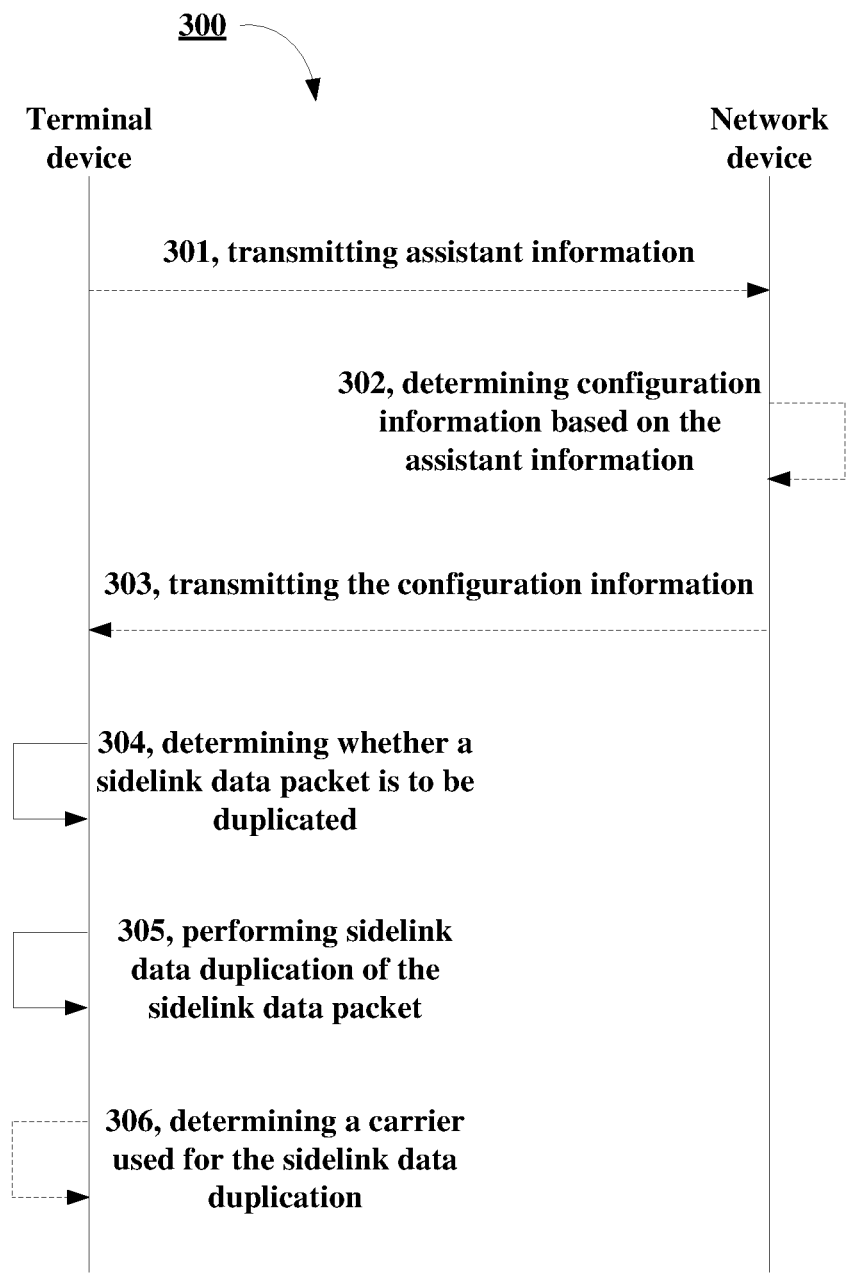
FIG. 3 is another flowchart which shows a method for sidelink data duplication in accordance with an embodiment of the present disclosure.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device may refer to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device, user equipment (UE), or other suitable devices that can access a wireless communication network and receive services therefrom. By way of example and not limitation, the terminal device may include, but not limited to, a mobile terminal, a subscriber station (SS), a portable subscriber station, a mobile station (MS), an access terminal (AT), in particular, e.g. portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably.

As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support sidelink communication and V2X sidelink communication.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from a network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

In order to expand the LTE to the automotive industry, an initial standard on support of V2V services was completed. Further enhancements which address additional V2X operation scenarios leveraging the LTE cellular infrastructure is planned for LTE release 15. It is then expected that also NR will support V2X services in the context of 5G.

Currently, 3GPP SA1 working group has completed new service requirements for future V2X services. SA1 had identified 25 use cases for advanced V2X services which will be used also in 5G. Such use cases may be categorized into four use case groups: vehicles platooning, extended sensors, advanced driving and remote driving. For these advanced applications, the expected requirements to meet the needed data rate, reliability, latency, communication range and speed are more stringent.

In order to support at least some of these advanced V2X services in LTE, a new work item on 3GPP V2X Phase 2 has started. The work item will specify solutions for some PC5 functionalities, which may co-exist in the same resource pools as release 14 functionality and use the same scheduling assignment format, the format could be decoded by UEs of the release 14, without causing significant degradation to release 14 PC5 operation compared to that of UEs of the release14.

The PC5 functionalities may include: carrier aggregation (CA), which may be up to 8 PC5 carriers; high order modulation, i.e. 64 QAM (quadrature amplitude modulation); reducing the maximum time between packet arrival at Layer 1 and resource selection for transmission; radio resource pool sharing between UEs using mode 3 and UEs using mode 4.

Packet duplication may increase reliability which is crucial for some sidelink services, for example, when the same packet is duplicated across different carriers in order to increase transmission diversity. In fact, sidelink transmissions are more subject to losses, for example, for an autonomous transmission of the terminal device, which may suffer from higher interference as well as half duplex and in-band emission issues.

In RAN1 #89, it was agreed that packet duplication, i.e. parallel transmission of replicated copies of the same packet (for example 'parallel' means at the same or different transmission time but on different carriers) could be considered as one of the use cases for PC5 carrier aggregation. Therefore, there are different options/methods to implement packet duplication based on carrier aggregation.

For example, packet duplication is performed at an MAC layer and may further include two options. An option is duplicated transmission of MAC PDUs. In this case, multiple transport blocks of the same size are created by the MAC entity and filled with the same duplicated MAC PDU. This option makes it possible to perform joint decoding (soft combining) at the receiver. However, the re-transmissions (which may be known as HARQ) among different carriers are coupled, i.e. requiring the same transport block size (TBS), which may not be always possible in view of carrier bandwidths and traffic loads.

Another option is duplicated transmission of MAC SDUs (Service Data Units). In this case, the MAC entity transmits the duplicated MAC SDUs via different carriers. The HARQ transmissions among the carriers and the required spectrum would be entirely independent. The existing radio link control (RLC) duplicate-discard function would handle the duplicates.

For another example, packet duplication is performed at PDCP layer by reusing the PDCP split bearer mechanism in CA framework. In this case, the RLC entities, i.e. logical channels below the split-PDCP, are associated with a same MAC entity. The duplication function, as well as duplicate-discard function, would lie in PDCP. The duplicated data would thus be mapped to different logical channels. The advantages of this case are that the duplication operation is transparent to MAC layer and the existing MAC functionality could be reused. The HARQ transmissions among the carriers are also independent in this case.

As mentioned in summary, data duplication may be more useful for a service requiring high reliability and/or low latency. Therefore, it is desirable to configure data duplication for a sidelink carrying that kind of service. However, currently quality of service (QoS) is not defined for sidelink. Therefore, a solution is needed to properly configure data duplication for sidelink.

Various embodiments of the present disclosure provide a solution to configuring data duplication for sidelink. Hereafter, some exemplary embodiments of the present disclosure will be described below with reference to the figures.

FIG. 1 shows a schematic diagram of a wireless communication network 100 in which embodiments of the disclosure may be implemented. As shown in FIG. 1, the wireless communication network 100 may include one or more network devices, for example network device 101.

It will be appreciated that the network device 101 could also be in a form of gNB, Node B, eNB, BTS (Base Transceiver Station), and/or BSS (Base Station Subsystem), access point (AP) and the like. The network device 101 may provide radio connectivity to a set of terminal devices or UEs 102-1, 102-2, . . . , 102-N (collectively referred to as "terminal device(s) 102") within its coverage, where N is a natural number.

The network device 101 may include processing circuitry, a device readable medium, interface, user interface equipment, auxiliary equipment, power source, power delivery circuitry, and antenna etc.

In practice, the network device 101 may include multiple different physical components that make up a single illustrated component (e.g., interface includes ports/terminals for coupling wires for a wired connection and radio front end circuitry for a wireless connection). As another example, the network device 101 may be a virtual network node. Similarly, the network node may be composed of multiple physically separate components (e.g., a NodeB component), which may each have its own respective components.

In certain scenarios in which the network device may include multiple separate components (e.g., BTS and BSC components), one or more of the separate components may be shared among several network nodes.

Although the network device 101 illustrated in the example wireless communication network may represent a device that includes a particular combination of hardware components, other embodiments may include network devices with different combinations of components. It is to be understood that a network device may include any suitable combination of hardware and/or software needed to perform the tasks, features, functions and methods disclosed herein.

It is to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

First Aspect of Embodiments

A method for sidelink data duplication is provided in an embodiment. The method is implemented at a terminal device as an example.

FIG. 2 is a flowchart which shows a method 200 for sidelink data duplication in accordance with an embodiment of the present disclosure, and illustrates the method for sidelink data duplication as an example. The method 200 is performed at a terminal device.

As shown in FIG. 2, the method 200 includes determining, by a terminal device, whether a sidelink data packet is to be duplicated based on a sidelink radio bearer (SLRB) on which the sidelink data packet is to be transmitted, at block 201; and performing, by the terminal device, sidelink data duplication of the sidelink data packet when it is determined that the sidelink data packet is to be duplicated based on the sidelink radio bearer, at block 202.

In an embodiment, the sidelink radio bearer may be identified by one or more of the following information: a sidelink radio bearer identifier (SLRB ID), information on packet priority (such as PPPP), one or more logical channel identifiers (LCIDs), a logical channel group (LCG) identifier, and a traffic flow identifier.

It should be appreciated that the information may be examples of this disclosure, but it is not limited thereto. For example, other traffic flow identifiers may be adopted according to actual scenarios.

For the sake of simplicity, it is also considered that a single packet is duplicated once in an embodiment. However, it may be easily extended to duplicate a single packet more than once in other embodiments.

In an embodiment, one or more sidelink radio bearers may be predefined or configured to allow for sidelink data duplication of sidelink data packets to be transmitted thereon.

For example, a need for sidelink data duplication is determined per sidelink radio bearer. More specifically, configured/pre-configured information or defined/pre-defined information may indicate whether a sidelink data packet associated to (or belonging to) a certain sidelink radio bearer is allowed to be duplicated or not. The reference to "a sidelink data packet associated/belonging to a sidelink radio bearer" or similar description may at least refer to the sidelink data packet will be transmitted on that sidelink radio bearer.

As one example, SLRB 1 identified by LCID 1 and LCID 2 may be pre-configured, such as semi-statically by a radio resource control (RRC) signaling, to allow for sidelink data duplication and all sidelink data packets belonging to the SLRB 1 are allowed to be duplicated.

As another example, SLRB 2 identified by LCID 3 and LCID 4 may be configured, such as dynamically by downlink control information (DCI), to allow for sidelink data duplication and all sidelink data packets belonging to the SLRB 2 are allowed to be duplicated.

As another example, SLRB 1 identified by priorities 1 and 2 may be defined, such as by a standard specification, to allow for sidelink data duplication and all sidelink data packets belonging to the SLRB 1 are allowed to be duplicated.

For the sake of simplicity, the terms 'configured/pre-configured' or 'defined/pre-defined' may be simplified as configured or defined, while the configured/pre-configured information or defined/pre-defined information may be referred to as 'configuration' or 'definition' in this disclosure. However, it is not limited thereto, other manners may be adopted in order to reach agreement between the network device and the terminal device.

As one example, the configuration or definition may indicate that the sidelink data packets are allowed to be duplicated when the sidelink data packets belong to sidelink radio bearers which have more stringent PDB requirements or packet error loss rate requirements.

As another example, the configuration or definition may indicate a list of sidelink radio bearer identifiers (e.g. SLRB IDs, or PPPPs, or LCIDs, or LCGs, or any other traffic flow identifiers), so that all packets associated to those indicated sidelink radio bearers are allowed to be duplicated.

In an embodiment, one or more conditions related to the one or more sidelink radio bearers may further be predefined or configured; and sidelink data packets associated to the one or more sidelink radio bearers are allowed to be duplicated when the one or more conditions are satisfied.

For example, the configuration or pre-configuration may indicate a list of sidelink radio bearer identifiers and threshold values for the identifiers, so that only sidelink data packets associated to the sidelink radio bearers of which sidelink radio bearer identifiers are larger than (or less than) the threshold values are allowed to be duplicated.

As one example, SLRB 1 identified by LCID 1-4 may be configured and a condition that LCID should be larger than 2 may further be configured, so that only sidelink data packets associated to the LCID 3 and LCID 4 are allowed to be duplicated.

As another example, SLRB 1 identified by priorities 1-8 (for example, the priority 1 is higher than the priority 8) may be defined and a condition that the priority should be larger than 4 may further be defined, so that only sidelink data packets associated to the SLRB 1 and with priority 1-3 are allowed to be duplicated.

In an embodiment, the terminal device may obtain one or more parameters for the sidelink data duplication. The terminal device may determine that the sidelink data packet is to be duplicated when it is predefined or configured that sidelink data packets associated to the sidelink radio bearer are allowed to be duplicated and the one or more parameters satisfy one or more predefined conditions.

For example, the need for sidelink data duplication may be determined on the basis of some of external conditions. Furthermore, the parameters and/or conditions may be configured by a network device dynamically or semi-statically.

In an embodiment, the parameters may include at least one of the following: congestion busy ratio (CBR) of the sidelink, channel state information (CSI) of the sidelink, and feedback information of the sidelink; part or all of which may be referred to as low layer information.

Additionally or alternatively, the parameters may include at least one of the following: hybrid automatic repeat request (HARQ) feedback, radio link control (RLC) status report, transmission control protocol (TCP) acknowledgement, and application layer acknowledgement; part or all of which may be referred to as high layer information.

Additionally or alternatively, the parameters may include at least one of the following: speed information of the terminal device, position information of the terminal device, battery information of the terminal device, and classification information of the terminal device.

It should be appreciated that the information may be examples of this disclosure, but it is not limited thereto. For example, other information or parameters may be adopted according to actual scenarios.

In this embodiment, the configuration or definition may allow/disallow sidelink data duplication by providing different values of any of the above parameters and the values are used to determine whether sidelink data duplication is allowed or not.

As an example, the configuration or definition may indicate that only if the experienced sidelink interference corresponds to a certain value or is above a certain interference threshold, sidelink data duplication could be allowed.

As another example, only if speed of the terminal device corresponds to a certain value or is above a certain speed threshold, sidelink packet duplication could be allowed.

As another example, only if the terminal device is located in a certain area (e.g. in a tunnel, or in a basement), sidelink data duplication could be allowed.

As another example, only if the CBR corresponds to a certain value or below a certain CBR threshold, sidelink data duplication could be allowed in order to avoid to further congest of the channel.

As another example, only if the left battery of the terminal device corresponds to a certain value or above a certain threshold, sidelink data duplication could be allowed.

As another example, only if the terminal device belongs to specific categories, such as the terminal device being related to public safety, sidelink data duplication could be allowed.

Additionally, the configuration or definition may indicate whether to perform sidelink data duplication or not on the basis of the acknowledgements received by the terminal device.

For example, the configuration or definition may indicate whether one or more sidelink data packets need to be duplicated depending on the received acknowledgements for corresponding sidelink radio bearers. The acknowledgments may be a plurality of radio layer acknowledgements, such as the HARQ feedbacks, or higher-layers acknowledgements, such as TCP acknowledgements or application layer acknowledgments.

In addition, the configuration or definition may indicate, for example, on the basis of the acknowledgements received over a certain time window (which may be application dependent), whether one or more sidelink data packets need to be duplicated.

The configuration or definition may, for example, indicate a ratio between the number of erroneously (or successfully) received packets (such as NACK or ACK) and the total number of transmitted data packets for one or more sidelink radio bearers, such that the sidelink data duplication may only be allowed if the ratio is above (or below) a configured or pre-configured value.

It should be appreciated the above external conditions may be examples of this disclosure, but it is not limited thereto. For example, one or more of the above examples may be combined according to actual scenarios.

For example, in case more than one of the above conditions occur, the configuration or definition may determine the behavior of the terminal device. For example, sidelink data duplication may be allowed if at least one of the above conditions occur, or only if a combination of such conditions occur, or only if some conditions with higher priority occur; in which case, the configuration or definition may associate a priority to each of the above possible conditions.

It should be appreciated that the control of the above external conditions may reside on different layers, therefore it may be assumed that implementation of the terminal device may provide a cross-layer signaling to enable/disable the sidelink data duplication.

In an embodiment, the sidelink data duplication of the sidelink data packet may be performed at a medium access control (MAC) layer of the terminal device. Alternatively, the sidelink data duplication of the sidelink data packet may be performed at a PDCP layer of the terminal device. Alternatively, the sidelink data duplication of the sidelink data packet may be performed at an application layer of the terminal device. The details of the sidelink data duplication may be described in the second aspect of embodiments.

In an embodiment, the terminal device may receive configuration information for the sidelink data duplication from a network device. Alternatively, the terminal device may transmit assist information for the sidelink data duplication to the network device.

FIG. 3 is another flowchart which shows a method 300 for sidelink data duplication in accordance with an embodiment of the present disclosure, and illustrates the method for sidelink data duplication as an example.

As shown in FIG. 3, the method 300 may include transmitting, by a terminal device, assist information for the sidelink data duplication to a network device, at 301.

In an embodiment, the assist information may include one or more of the following: capability information of the terminal device, information on which layer the sidelink data duplication is performed, and information on the sidelink radio bearer for which sidelink data duplication is desired. However, it is not limited thereto.

For example, the terminal device may report its capability of whether sidelink data duplication is supported or not, and optionally, also may report at which layer the sidelink data duplication is performed (e.g. at MAC layer or PDCP layer).

This information may be reported via a dedicated signaling, e.g. a radio resource control (RRC) signaling.

As one example, the network device may configure the sidelink data duplication and send the signaling to a terminal device in a connected mode, only when sidelink data duplication is supported by the terminal device. The supported layer information, e.g. at which layer the sidelink data duplication is performed, may help the network device to determine how scheduling should be performed when the sidelink data duplication is actually activated.

For instance, a same modulation and coding scheme (MCS) should be adopted when sidelink data duplication is performed at the MAC layer, while independent scheduling per carrier should be adopted when sidelink data duplication is performed at a higher layer.

As another example, the terminal device may also indicate the sidelink radio bearer identifiers for which sidelink data duplication is desired. That may depend on the priorities determined by the network device or an application layer of the terminal device for different radio bearer identifiers.

As another example, upon receiving a sidelink radio bearer identifier from a terminal device in a connected mode and the terminal device supports sidelink duplication, the network device may determine if sidelink data duplication is allowed for the indicated sidelink radio bearer identifier and inform this to the terminal device via a broadcast signaling or a dedicated signaling.

As shown in FIG. 3, the method 300 may further include determining, by the network device, configuration information for sidelink data duplication based on the assist information, at 302; and transmitting, by the network device, configuration information for the sidelink data duplication to the terminal device, at 303.

In an embodiment, the configuration information may be transmitted in different ways. In one example, the network device may configure sidelink data duplication for which sidelink radio bearer identifier is allowed, and inform this using a broadcast signaling (e.g. SIB) when the terminal device is in an idle mode and/or a connected mode.

As one example, the network device may configure sidelink data duplication for which sidelink radio bearer identifier is allowed, and inform this via a dedicated signaling (e.g. RRC signaling) when the terminal device is in a connected mode and supports sidelink data duplication.

It should be appreciated that dynamic configuration of sidelink data duplication is also possible. For example, a dedicated signaling, e.g. MAC control element (CE), may be used to inform how sidelink data duplication should be adopted when the terminal device is operating in mode 3 (i.e. network controlled). In this case, it is not necessary for the network device to transmit all of configuration to the terminal device.

For instance, the network device may only inform part of the configuration to the terminal device, while the terminal device may perform measurements on the parameters as described above and report the measurement results to the network device.

Alternatively, the terminal device may adopt the sidelink data duplication on itself based on the configuration. This is feasible for terminal devices in both mode 3 and mode 4, while it may be more preferable for terminal device in mode 4.

As shown in FIG. 3, the method 300 may further include determining, by the terminal device, whether a sidelink data packet is to be duplicated based on a sidelink radio bearer on which the sidelink data packet is to be transmitted, at 304; and performing, by the terminal device, sidelink data duplication of the sidelink data packet when it is determined that the sidelink data packet is to be duplicated based on the sidelink radio bearer, at 305.

As shown in FIG. 3, the method 300 may further include determining, by the terminal device, a carrier used for the sidelink data duplication based on configuration information from a network device and/or one or more parameters obtained by the terminal device, at block 306.

For example, different sidelink carriers may be prioritized according to certain criteria and the terminal device may transmit the sidelink data duplication on the carriers with higher priority.

For instance, the terminal device may perform sensing on the sidelink, and then sorts the carriers on which available resources could be found, in ascending order of CBR. After this, the terminal device may identify the sidelink radio bearer identifier with the highest priority, for which sidelink data duplication is allowed and having the data waiting for transmission. Then the terminal device may determine which carrier with available resource could/should be used for duplicated transmission of the sidelink radio bearer identifier. Determination may be started from the carrier with the lowest CBR, until all the carriers that could be used to perform the duplicated transmission for the identified sidelink radio bearer identifier are determined.

It should be appreciated that FIG. 3 is an example of the disclosure, but it is not limited thereto. For example, the order of operations at blocks (or steps) may be adjusted and/or some blocks (or steps) may be omitted. Moreover, some blocks (or steps) not shown in FIG. 3 may be added.

As can be seen from the above embodiments, whether a sidelink data packet is to be duplicated is determined by a terminal device based on a sidelink radio bearer on which the sidelink data packet is to be transmitted. Therefore, a solution is proposed to properly configure data duplication for sidelink.

Furthermore, sidelink packet duplication for a specific kind of traffic may be enabled based on an existing framework. Therefore, performance of the sidelink could be improved and impact on the existing framework could be small.

In addition, with the sidelink packet duplication, a framework with differentiated QoS can be provided for a sidelink traffic that requires high reliability. Furthermore, dynamic configuration may be possible based on changing behavior and radio condition of the terminal device.

Second Aspect of Embodiments

Based on the first aspect of embodiments, how to perform the sidelink data duplication will be illustrated in the second aspect of embodiments. It should be appreciated that the embodiments of the second aspect may be independent from the embodiments of the first aspect.

In an embodiment, sidelink data duplication of the sidelink data packet may be performed at a medium access control (MAC) layer of the terminal device. The MAC layer may be informed of a mapping of a logical channel and the sidelink radio bearer by a packet data convergence protocol (PDCP) layer and/or a radio link control (RLC) layer.

Figure 4:
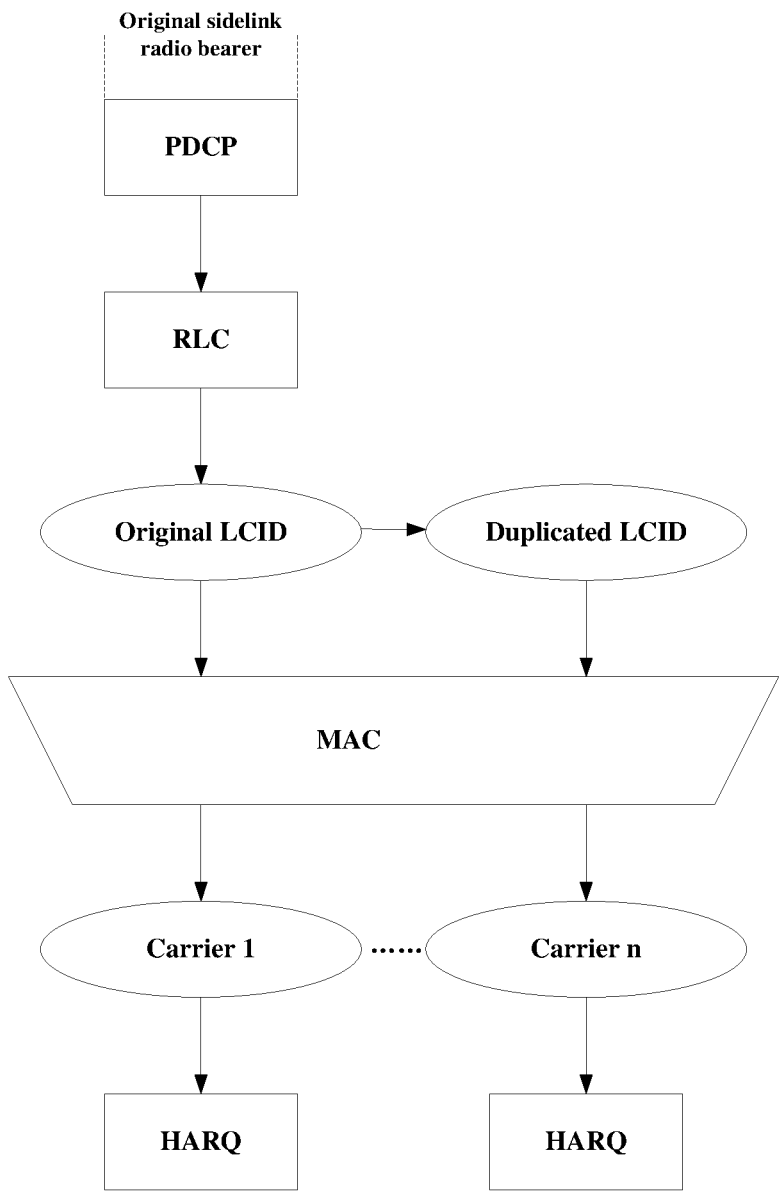
FIG. 4 is a schematic diagram which shows sidelink data duplication is performed at the MAC layer in accordance with an embodiment of the present disclosure.

FIG. 4 is a schematic diagram which shows sidelink data duplication is performed at the MAC layer in accordance with an embodiment of the present disclosure. As shown in FIG. 4, the MAC layer is responsible for multiplexing/demultiplexing data across multiple carriers, therefore irrespective of the layer which performs the actual packet duplication. The MAC layer should be aware of the logical channel which contains duplicated content in order to deliver it in a proper carrier.

In an embodiment, one or more sidelink radio bearers may be predefined or configured or determined by an application layer or by a duplication function of the terminal device with a mapping to the sidelink radio bearers that is allowed for the sidelink data duplication.

For example, in the case that the sidelink data duplication is performed at MAC layer, the terminal device may map one LCID to one of the sidelink radio bearers (which may be identified by one of the sidelink radio bearer identifiers) where sidelink data duplication is allowed to be performed depending on the configuration or definition. An MAC entity may be informed that the LCID for sidelink packet duplication is configured.

When receiving data from upper layers on at least one of those logical channels, the MAC entity will perform duplicated transmission of either MAC PDUs or MAC SDUs among different sidelink carriers. Which LCID is to be used for the duplicated transmissions at MAC layer may be up to implementation of the terminal device or may be given by the configuration or definition.

For example, the configuration or definition may indicate the sidelink radio bearer identifiers that are allowed to be duplicated. Each of the sidelink radio bearer identifiers may be associated to a set of LCIDs that the terminal device may use them for the duplicated transmissions.

In an embodiment, the sidelink data packet is to be transmitted on a first sidelink radio bearer; and a duplicated sidelink data packet obtained from the sidelink data duplication is to be transmitted on a second sidelink radio bearer. The identifier of the second sidelink radio bearer may be the same as the identifier of the first sidelink radio bearer, alternatively, may not be the same as the identifier of the first sidelink radio bearer.

In an embodiment, the second sidelink radio bearer may be mapped to a sidelink radio bearer with the lowest priority. Alternatively, the second sidelink radio bearer may be mapped to a sidelink radio bearer having an identifier which is equal to the identifier of the first sidelink radio bearer adjusted by a predefined or configured value.

For example, some configured or defined rules may be used, e.g. the lowest LCID (i.e. LCID 8) is used to identify a duplicated sidelink data packet, or the LCID of the duplicated transmission shall be equal to the LCID of the original transmission adjusted by (e.g. plus) a certain value (e.g. 1). For example, the LCID of the original transmission is 3 and the LCID of the duplication transmission is 4. However, it is not limited thereto.

Alternatively, the configuration or definition may also indicate (such as, either dynamically or semi-statically) the carrier (e.g. the serving cell index, or the frequency) in which the duplicated sidelink data packet should be transmitted. Alternatively, the terminal device may autonomously determine in which carrier the duplicated sidelink data packet should be transmitted depending on radio conditions, e.g., interference level, and/or CBR, and/or block error rate (BLER).

In an embodiment, the data duplication of the sidelink data packet may be performed at a PDCP layer of the terminal device.

Figure 5:
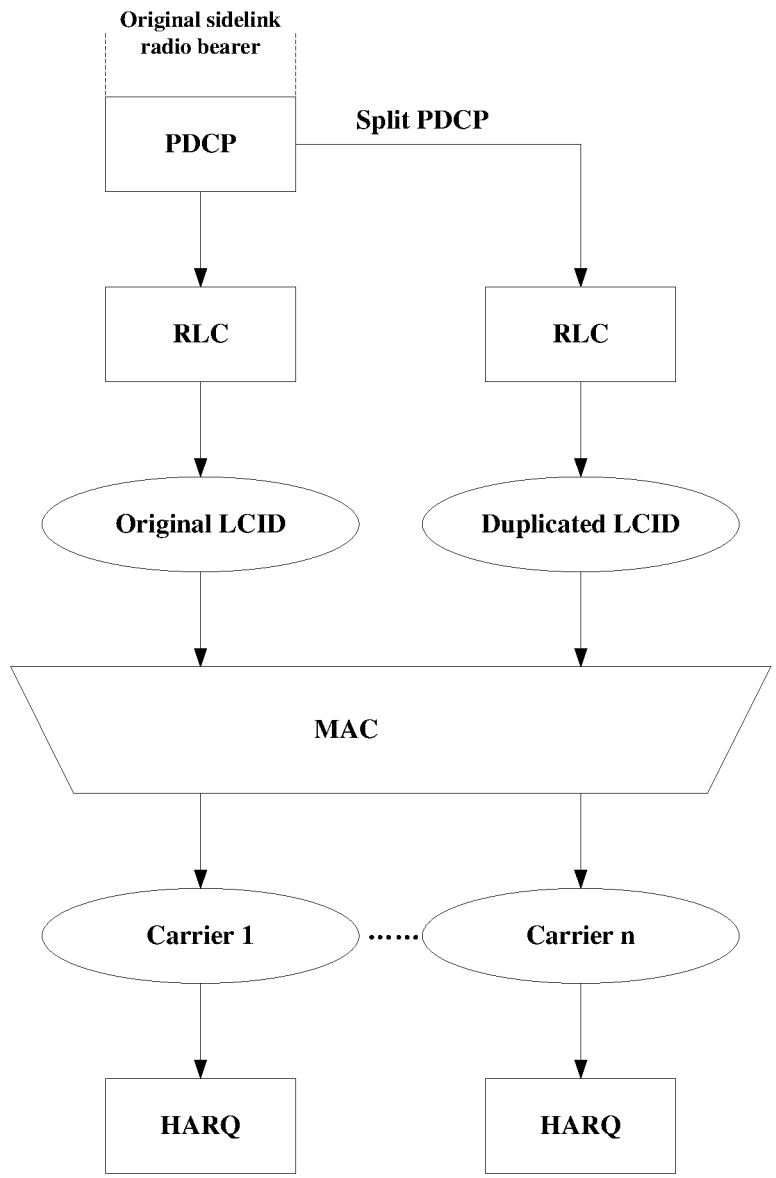
FIG. 5 is a schematic diagram which shows sidelink data duplication is performed at the PDCP layer in accordance with an embodiment of the present disclosure.

FIG. 5 is a schematic diagram which shows sidelink data duplication is performed at the PDCP layer in accordance with an embodiment of the present disclosure.

For example, in the case that the sidelink data duplication is performed at the PDCP layer, the terminal device may map multiple LCIDs to the same sidelink radio bearer (which may be identified by one of the sidelink radio bearer identifiers) where sidelink data duplication is allowed and these LCIDs will be mapped to the same split-PDCP entity.

For example, if the sidelink data duplication happens at PDCP layer, the PDCP entity may submit the original data packet and the duplicated data packet to two different RLC entities. The two RLC entities may submit the RLC PDUs in turn to MAC layer through two different logical channels (with LCIDs). Which LCID is to be used for the duplicated transmission at MAC layer may be up to implementation of the terminal device or may be given by the configuration or definition.

For example, the configuration or definition may indicate the sidelink radio bearer identifiers that are allowed to be duplicated. Each of the sidelink radio bearer identifiers may be associated to a set of LCIDs that the terminal device may use them for the duplicated transmissions.

For example, some configured or defined rules may be used, e.g. the lowest LCID (i.e. LCID 8) is used to identify a duplicated sidelink data packet, or the LCID of the duplicated transmission shall be equal to the LCID of the original transmission plus a certain value (e.g. 1). For example, the LCID of the original transmission is 3 and the LCID of the duplication transmission is 4. However, it is not limited thereto.

Alternatively, the configuration or definition may also indicate (such as, either dynamically or semi-statically) the carrier (e.g. the serving cell index, or the frequency) in which the duplicated sidelink data packet should be transmitted. Alternatively, the terminal device may autonomously determine in which carrier the duplicated sidelink data packet should be transmitted depending on radio conditions, e.g., interference level, and/or CBR, and/or BLER.

In an embodiment, the data duplication of the sidelink data packet may be performed at an application layer of the terminal device.

Figure 6:
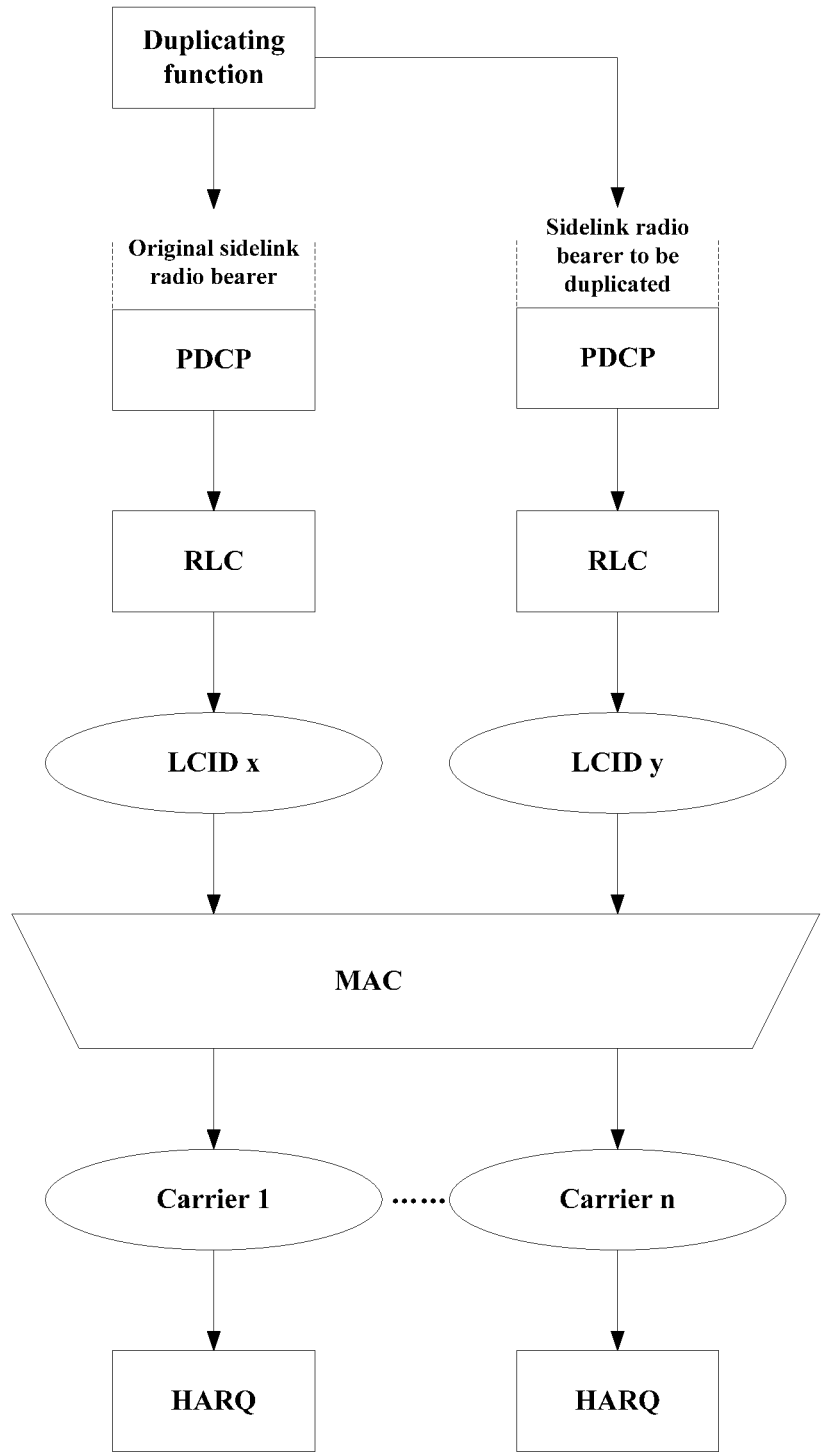
FIG. 6 is a schematic diagram which shows sidelink data duplication is performed at the application layer in accordance with an embodiment of the present disclosure.

FIG. 6 is a schematic diagram which shows sidelink data duplication is performed at the application layer in accordance with an embodiment of the present disclosure.

For example, rather than a split-PDCP entity, a dedicated sidelink radio bearer identifier may be used to deliver a duplicated sidelink data packet which is generated by a duplicating function that resides outside radio access network (RAN) layers. Which sidelink radio bearer identifier to use in this case may depend on configuration or definition or the application layer.

For example, the configuration/application layer may indicate to lower layers that a set of sidelink radio bearer identifiers should be used to indicate duplicated transmissions to the lower layers.

For example, some configured or defined rules may be used, e.g. the lowest sidelink radio bearer identifier (i.e. LCID 8) is used and reserved to identify a duplicated sidelink data packet, or the sidelink radio bearer identifier of the duplicated transmission shall be equal to the sidelink radio bearer identifier of the original transmission plus a certain value (e.g. 1). For example, the sidelink radio bearer identifier of the original transmission is 3 and the sidelink radio bearer identifier of the duplication transmission is 4. However, it is not limited thereto.

Alternatively, the sidelink radio bearer identifier that carries duplicated sidelink data packets may also be associated to transmissions on certain carriers and that communicated to lower layers in the terminal device. The carrier may depend on configuration, or may be autonomously determined by the terminal device on the basis of radio conditions, e.g., interference level, and/or CBR, and/or BLER.

In an embodiment, one or more sidelink radio bearers may be predefined or configured or determined by the application layer or by a duplication function of the terminal device to indicate that sidelink data packets associated to the sidelink radio bearer are allowed for the sidelink data duplication.

In an embodiment, one or more sidelink radio bearers may be predefined or configured or determined by the application layer or by a duplication function of the terminal device to indicate the one or more sidelink radio bearers of the sidelink data packets that are duplicated.

It should be appreciated that, regardless of which split bearer mechanism is used, the MAC entity may just transmit the data from the higher layer regardless whether sidelink data duplication has been performed or not.

Third Aspect of Embodiments

A method for sidelink data duplication is provided in an embodiment. The method is implemented at a network device as an example, and the same contents as those in the first and second aspects of embodiments are omitted.

Figure 7:
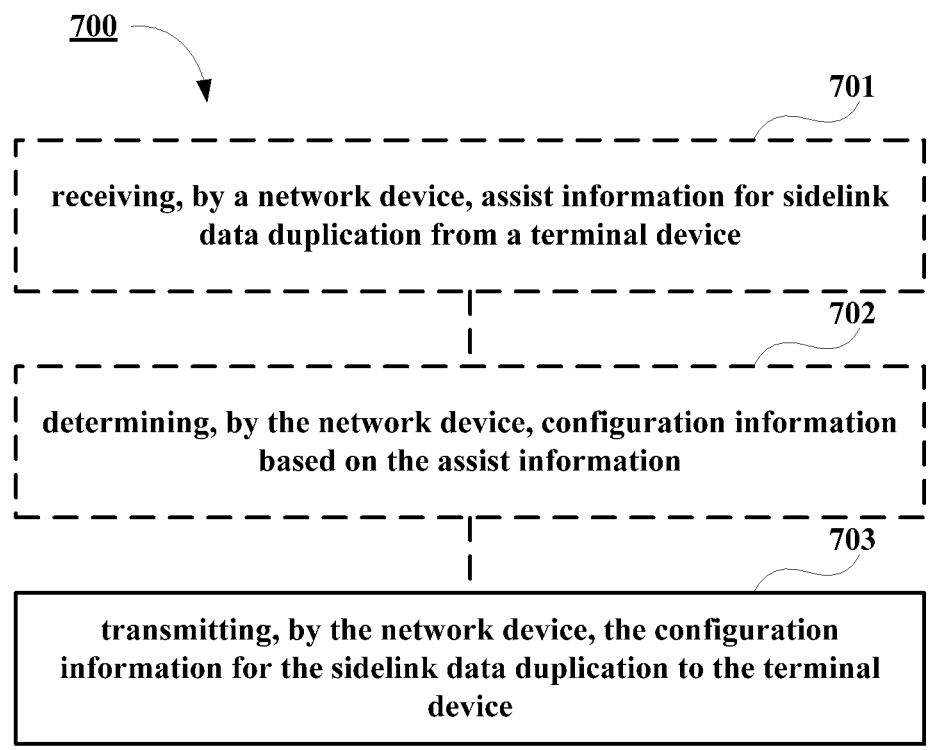
FIG. 7 is another flowchart which shows a method for sidelink data duplication in accordance with an embodiment of the present disclosure.

FIG. 7 is a flowchart which shows a method 700 for sidelink data duplication in accordance with an embodiment of the present disclosure, and illustrates the method for sidelink data duplication as an example.

As shown in FIG. 7, the method 700 includes transmitting, by a network device, configuration information for the sidelink data duplication to a terminal device, at block 703; the configuration information is used by the terminal device to determine whether a sidelink data packet is to be duplicated based on a sidelink radio bearer on which the sidelink data packet to be transmitted.

In an embodiment, the configuration information may be transmitted via a broadcast signaling and/or a dedicated signaling.

As shown in FIG. 7, the method 700 may further include receiving, by the network device, assist information for the sidelink data duplication from the terminal device, at block 701; and determining, by the network device, the configuration information based on the assist information, at block 702.

In an embodiment, the assist information may include at least one of the following: capability information of the terminal device, information on which layer the sidelink data duplication is performed, and information on the sidelink radio bearer for which sidelink data duplication is desired.

As can be seen from the above embodiments, whether a sidelink data packet is to be duplicated is determined by a terminal device based on a sidelink radio bearer on which the sidelink data packet is to be transmitted. Therefore, a solution is proposed to properly configure data duplication for sidelink.

Fourth Aspect of Embodiments

An apparatus for sidelink data duplication is provided in an embodiment. The apparatus may be the terminal device 102 or may be configured in the terminal device 102, and the same contents as those in the first to third aspects of embodiments are omitted.

Figure 8:
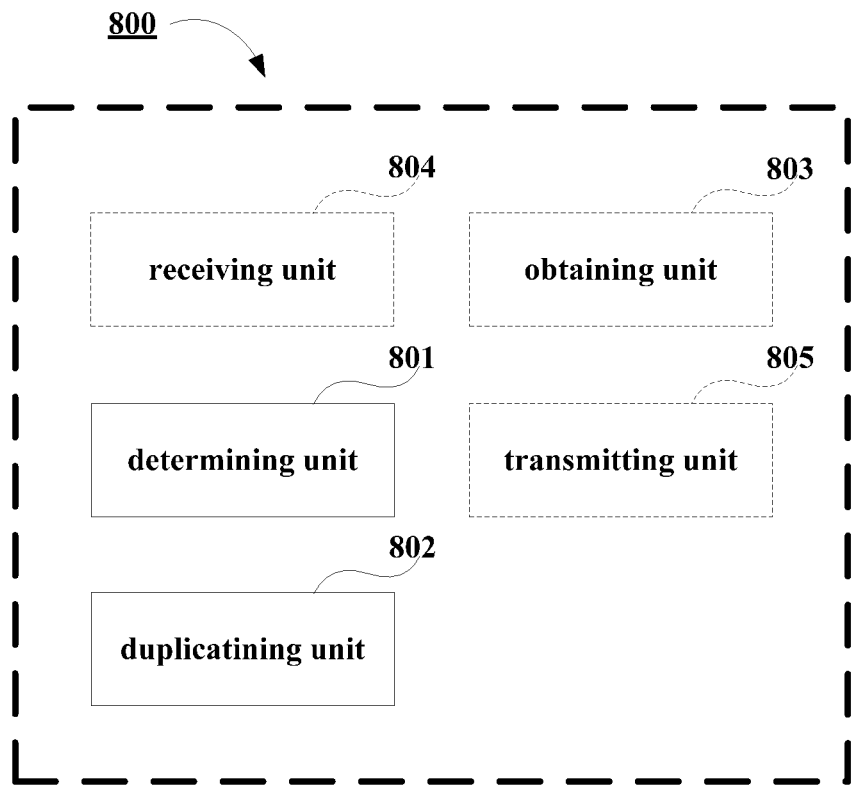
FIG. 8 is a block diagram which shows an apparatus for sidelink data duplication in accordance with an embodiment of the present disclosure.

FIG. 8 shows a block diagram of an apparatus 800 for sidelink data duplication in accordance with an embodiment of the present disclosure.

As shown in FIG. 8, the apparatus 800 includes: a determining unit 801 configured to determine whether a sidelink data packet is to be duplicated based on a sidelink radio bearer on which the sidelink data packet is to be transmitted; and a duplicating unit 802 configured to perform sidelink data duplication of the sidelink data packet when it is determined that the sidelink data packet is to be duplicated based on the sidelink radio bearer.

As shown in FIG. 8, the apparatus 800 may further include: an obtaining unit 803 configured to obtain one or more parameters for the sidelink data duplication; the parameters may include at least one of the following: a congestion busy ratio (CBR) of a sidelink, channel state information (CSI) of the sidelink, feedback information of the sidelink; a hybrid automatic repeat request (HARQ) feedback, a radio link control (RLC) status report, transmission control protocol acknowledgement, application layer acknowledgement; speed information of the terminal device, position information of the terminal device, battery information of the terminal device, and classification information of the terminal device.

As shown in FIG. 8, the apparatus 800 may further include: a receiving unit 804 configured to receive configuration information for the sidelink data duplication from a network device.

As shown in FIG. 8, the apparatus 800 may further include: a transmitting unit 805 configured to transmit assist information for the sidelink data duplication to the network device.

It should be appreciated that components included in the apparatus 800 correspond to the operations of the method 200. Therefore, all operations and features described above with reference to FIG. 2 is likewise applicable to the components included in the apparatus 800 and have similar effects. For the purpose of simplification, the details will be omitted.

It should be appreciated that the components included in the apparatus 800 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 800 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 800 may be a part of a device. But it is not limited thereto, for example, the apparatus 800 may be the terminal device 102, other parts of the terminal device 102, such as transmitter and receiver, are omitted in the FIG. 8.

As can be seen from the above embodiments, whether a sidelink data packet is to be duplicated is determined by a terminal device based on a sidelink radio bearer on which the sidelink data packet is to be transmitted. Therefore, a solution is proposed to properly configure data duplication for sidelink.

Fifth Aspect of Embodiments

An apparatus for sidelink data duplication is provided in an embodiment. The apparatus may be the network device 101 or may be configured in the network device 101, and the same contents as those in the first to third aspects of embodiments are omitted.

Figure 9:
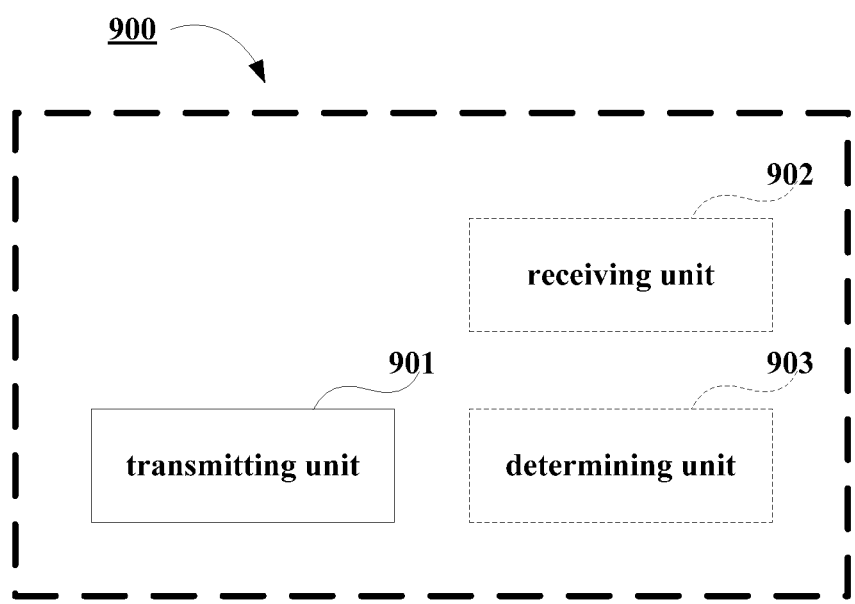
FIG. 9 is another block diagram which shows an apparatus for sidelink data duplication in accordance with an embodiment of the present disclosure.

FIG. 9 shows a block diagram of an apparatus 900 for sidelink data duplication in accordance with an embodiment of the present disclosure.

As shown in FIG. 9, the apparatus 900 includes: a transmitting unit 901 configured to transmit configuration information for the sidelink data duplication to a terminal device; the configuration information is used by the terminal device to determine whether a sidelink data packet is to be duplicated based on a sidelink radio bearer on which the sidelink data packet to be transmitted.

As shown in FIG. 9, the apparatus 900 may further include: a receiving unit 902 configured to receive assist information for the sidelink data duplication from the terminal device; and a determining unit 903 configured to determine the configuration information from the assist information.

It should be appreciated that components included in the apparatus 900 correspond to the operations of the method 700. Therefore, all operations and features described above with reference to FIG. 7 is likewise applicable to the components included in the apparatus 900 and have similar effects. For the purpose of simplification, the details will be omitted.

It should be appreciated that the components included in the apparatus 900 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 900 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 900 may be a part of a device. But it is not limited thereto, for example, the apparatus 900 may be the network device 101, other parts of the network device 101, such as transmitter and receiver, are omitted in the FIG. 9.

As can be seen from the above embodiments, whether a sidelink data packet is to be duplicated is determined by a terminal device based on a sidelink radio bearer on which the sidelink data packet is to be transmitted. Therefore, a solution is proposed to properly configure data duplication for sidelink.

Sixth Aspect of Embodiments

A communications system is provided, as shown in FIG. 1, the communication system 100 includes a network device 101 configured to perform a method for sidelink data duplication according to the third aspect of embodiments and a terminal device 102 configured to perform a method for sidelink data duplication according to the first aspect of embodiments.

A device (such as a network device 101 or a terminal device 102) is provided in an embodiment, and the same contents as those in the first to fourth aspects of embodiments are omitted.

Figure 10:
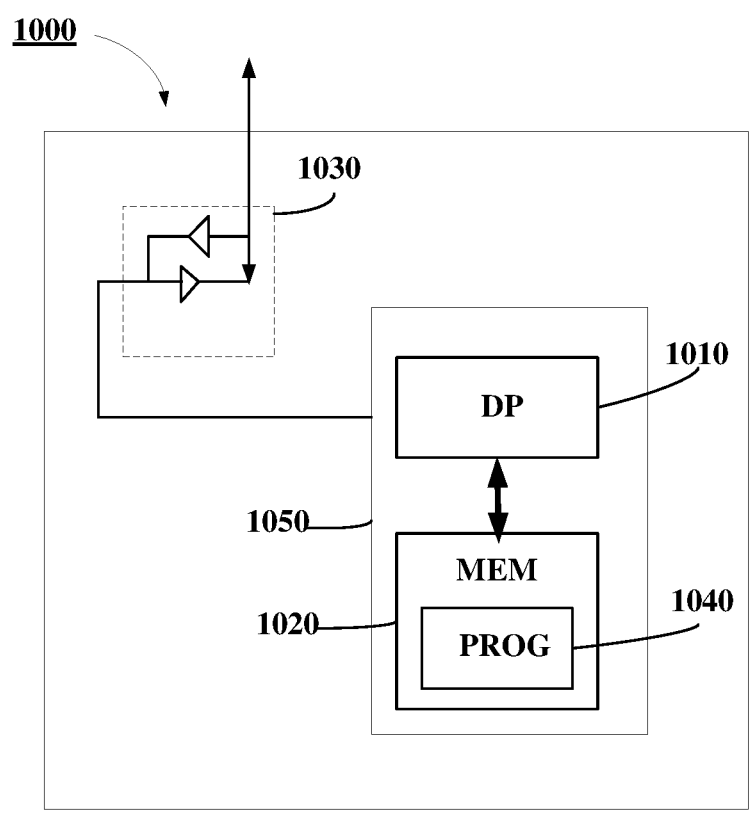
FIG. 10 is a simplified block diagram of a device that is suitable for implementing embodiments of the present disclosure.

FIG. 10 shows a simplified block diagram of a device 1000 that is suitable for implementing embodiments of the present disclosure. It would be appreciated that the device 1000 may be implemented as at least a part of, for example, the network device 101 or the terminal device 102.

As shown, the device 1000 includes a communicating means 1030 and a processing means 1050. The processing means 1050 includes a data processor (DP) 1010, a memory (MEM) 1020 coupled to the DP 1010. The communicating means 1030 is coupled to the DP 1010 in the processing means 1050. The MEM 1020 stores a program (PROG) 1040. The communicating means 1030 is for communications with other devices, which may be implemented as a transceiver for transmitting/receiving signals.

In some embodiments, the device 1000 acts as a terminal device. For example, the memory 1020 stores a plurality of instructions; and the processor 1010 coupled to the memory 1020 and configured to execute the instructions to: determine whether a sidelink data packet is to be duplicated based on a sidelink radio bearer on which the sidelink data packet is to be transmitted; and perform sidelink data duplication of the sidelink data packet when it is determined that the sidelink data packet is to be duplicated based on the sidelink radio bearer.

In some other embodiments, the device 1000 acts as a network device. For example, the memory 1020 stores a plurality of instructions; and the processor 1010 coupled to the memory 1020 and configured to execute the instructions to: transmit configuration information for the sidelink data duplication to a terminal device. The configuration information is used by the terminal device to determine whether a sidelink data packet is to be duplicated based on a sidelink radio bearer on which the sidelink data packet to be transmitted.

The PROG 1040 is assumed to include program instructions that, when executed by the associated DP 1010, enable the device 1000 to operate in accordance with the embodiments of the present disclosure, as discussed herein with the methods 200-700. The embodiments herein may be implemented by computer software executable by the DP 1010 of the device 1000, or by hardware, or by a combination of software and hardware. A combination of the data processor 1010 and MEM 1020 may form processing means 1050 adapted to implement various embodiments of the present disclosure.

The MEM 1020 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 1000, there may be several physically distinct memory modules in the device 1000. The DP 1010 may be of any type suitable to the local technical environment, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing.

More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method in a terminal device for sidelink data duplication, comprising:
   determining whether a sidelink data packet is to be duplicated based on a sidelink radio bearer on which the sidelink data packet is to be transmitted and a threshold value associated with the sidelink radio bearer; and
   performing sidelink data duplication of the sidelink data packet when determined that the sidelink data packet is to be duplicated based on a parameter for the sidelink radio bearer being less than the threshold value;
   wherein the sidelink data duplication of the sidelink data packet is performed at a packet data convergence protocol (PDCP) layer of the terminal device.

2. The method according to claim 1, wherein the sidelink radio bearer is identified by one or more of the following information: a sidelink radio bearer identifier, information on packet priority, one or more logical channel identifiers, a logical channel group identifier, and a traffic flow identifier.

3. The method according to claim 1, wherein the sidelink radio bearer is predefined or configured.

4. The method according to claim 1, wherein the method further comprises:
   obtaining the parameter for the sidelink data duplication;
   wherein the parameter comprises one or more of: a congestion busy ratio (CBR) of a sidelink, channel state information (CSI) of the sidelink, feedback information of the sidelink; a hybrid automatic repeat request (HARQ) feedback, a radio link control (RLC) status report, transmission control protocol acknowledgement, application layer acknowledgement; speed information of the terminal device, position information of the terminal device, battery information of the terminal device, and classification information of the terminal device.

5. The method according to claim 1, wherein the sidelink data packet is to be transmitted on a first sidelink radio bearer; and a duplicated sidelink data packet obtained from the sidelink data duplication is to be transmitted on a second sidelink radio bearer.

6. The method according to claim 5, wherein the second sidelink radio bearer is mapped to one of:
a sidelink radio bearer with the lowest priority;
a sidelink radio bearer having an identifier which is equal to the identifier of the first sidelink radio bearer adjusted by a predefined or configured value; or
a sidelink radio bearer having an identifier which is reserved for the duplicated sidelink data packet.

7. The method according to claim 1, wherein the method further comprises:
receiving configuration information for the sidelink data duplication from a network device;
wherein the configuration information is transmitted via a broadcast signaling, a dedicated signaling, or both the broadcast signaling and the dedicated signaling.

8. The method according to claim 7, wherein the method further comprises:
transmitting assist information for the sidelink data duplication to the network device.

9. The method according to claim 8, wherein the assist information comprises one or more of: capability information of the terminal device, information on which layer the sidelink data duplication is performed, and information on the sidelink radio bearer for which sidelink data duplication is desired.

10. The method according to claim 1, wherein the method further comprises:
determining a carrier used for the sidelink data duplication based on configuration information from a network device, one or more parameters obtained by the terminal device, or both the configuration information from the network device and the one or more parameters obtained by the terminal device.

11. A method in a network device for sidelink data duplication, comprising:
transmitting configuration information for the sidelink data duplication to a terminal device, wherein the sidelink data duplication of a sidelink data packet is performed at a packet data convergence protocol (PDCP) layer of the terminal device; and
wherein the configuration information is used by the terminal device to determine whether the sidelink data packet is to be duplicated, based on a sidelink radio bearer on which the sidelink data packet is to be transmitted and a threshold value associated with the sidelink radio bearer, in order for the terminal device to perform the sidelink data duplication of the sidelink data packet when a parameter for the sidelink radio bearer is less than the threshold value.

12. The method according to claim 11, wherein the configuration information is transmitted via a broadcast signaling, a dedicated signaling, or both broadcast signaling and dedicated signaling.

13. The method according to claim 11, wherein the method further comprises:
receiving assist information for the sidelink data duplication from the terminal device; and
determining the configuration information from the assist information.

14. The method according to claim 13, wherein the assist information comprises one or more of: capability information of the terminal device, information on which layer the sidelink data duplication is performed, and information on the sidelink radio bearer for which sidelink data duplication is desired.

15. A terminal device for sidelink data duplication comprising:
a processor; and
a memory containing instructions which, when executed by the processor, cause the terminal device to perform operations to:
determine whether a sidelink data packet is to be duplicated based on a sidelink radio bearer on which the sidelink data packet is to be transmitted and a threshold value associated with the sidelink radio bearer; and
perform sidelink data duplication of the sidelink data packet when determined that the sidelink data packet is to be duplicated based on a parameter for the sidelink radio bearer being less than the threshold value;
wherein the sidelink data duplication of the sidelink data packet is performed at a packet data convergence protocol (PDCP) layer of the terminal device.

16. A network device for sidelink data duplication comprising:
a processor; and
a memory containing instructions which, when executed by the processor, cause the network device to perform operations to:
transmit configuration information for the sidelink data duplication to a terminal device, wherein the sidelink data duplication of a sidelink data packet is performed at a packet data convergence protocol (PDCP) layer of the terminal device; and
wherein the configuration information is used by the terminal device to determine whether the sidelink data packet is to be duplicated, based on a sidelink radio bearer on which the sidelink data packet is to be transmitted and a threshold value associated with the sidelink radio bearer, in order for the terminal device to perform the sidelink data duplication of the sidelink data packet when a parameter for the sidelink radio bearer is less than the threshold value.

* * * * *